Jan. 18, 1966  J. W. GRAY  3,230,359
COSINE FUNCTION INTEGRATOR
Filed June 11, 1962  2 Sheets—Sheet 1

INVENTOR.
JOHN W. GRAY

BY *H. S. Mackey*

ATTORNEY

INVENTOR.
JOHN W. GRAY

BY *H. S. Mackey*

ATTORNEY

United States Patent Office 3,230,359
Patented Jan. 18, 1966

3,230,359
COSINE FUNCTION INTEGRATOR
John W. Gray, Pleasantville, N.Y., assignor to General Precision, Inc., a corporation of Delaware
Filed June 11, 1962, Ser. No. 201,721
4 Claims. (Cl. 235—183)

This invention relates to function generators and particularly to those generating an integral of a cosine function.

A common problem in air navigation is to determine the distance travelled along a straight course from origin to destination. Even though the aircraft departs from its planned straight course the problem may still be solved if continuous ground speed and course angle data be available. The speed, $s$, along the planned course at any instant is then the component in the planned course direction of the actual ground track speed. Since distance is the integral of speed, the distance travelled is secured by integrating the planned course component speed.

An approximate solution for distance travelled is provided by this invention, the instrumentation being a combination of a rate servomechanism and an approximate cosine function generator. The rate servomechanism is employed as an integrator and, with the function generator inserted in its feedback loop, the integrated function is obtained.

In one specific embodiment, a motor generator rate servomechanism receives a potential magnitude which is an analogue of aircraft speed along its ground track. The generator feedback loop includes a cosine generating network having an angular setting which is adjusted in accordance with input data representing the difference between planned course angle and actual course angle. The integrated cosine output, representing distance travelled along the planned course, is then the integral of the product of the cosine function and the input potential, and is represented by the elapsed angle through which the motor shaft has turned.

One purpose of this invention is, in an aircraft navigational computer, to compute distance travelled from course and speed data.

A more specific purpose of this invention is to derive from angular and potential input data a function representing the integral of the product of the potential input and the cosine of the angle.

A further understanding of this invention may be secured from the detailed description and associated drawings, in which.

Figure 1:
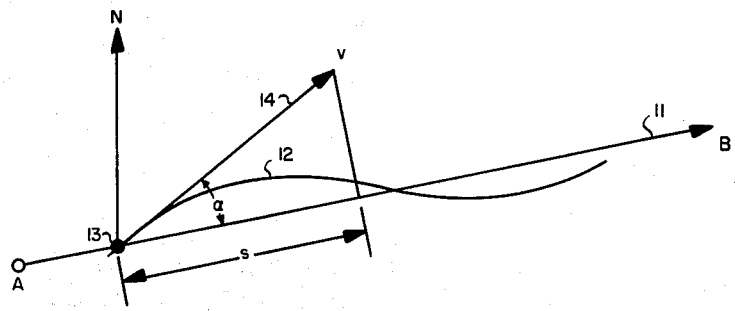
FIGURE 1 is a graphic illustration used to explain the principles of the invention.

Referring now to FIGURE 1, an aircraft which is to fly a planned straight course 11 from A to B actually flies a curved course 12. At the instant when the aircraft is at the point 13, its ground track direction tangent to the curve 12 is in the direction of the arrow 14, and its horizontal speed, $s$, along the planned course 11 is then $$s = v \cos \alpha \qquad (1)$$

in which $v$ is the velocity of the aircraft and $\alpha$ is the angle between the planned course 11 and the actual course 14. Distance flown, D, along the planned course is the time integral of speed or $$D = \int v \cos \alpha \, dt \qquad (2)$$

Figure 2:
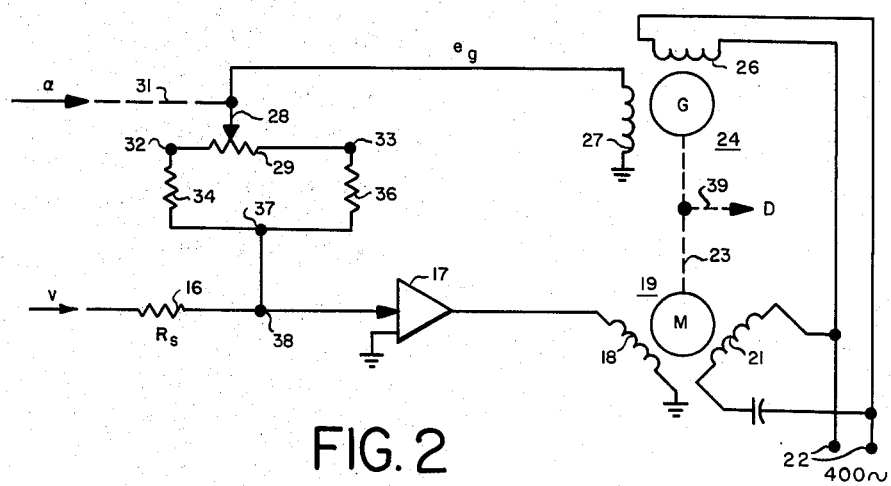
FIGURE 2 is a schematic diagram of an embodiment in which the course error angle limits are ±90°.

FIGURE 2 approximately instruments Equation 2. In this figure, data in the form of an alternating voltage magnitude, $v$, represents aircraft speed in the actual ground track direction, such as direction 14, FIGURE 1. This voltage $v$ is applied to a fixed resistor 16, FIGURE 2, and through it to a high-gain amplifier 17. The amplifier output is connected to energize one phase winding 18 of a two-phase motor 19. The other phase winding 21 is connected to a source 22 of alternating potential which may, for example, have a frequency of 400 c.p.s. The source 22 is also the power source from which the input signal $v$ is derived.

The shaft 23 of motor 19 is connected to drive a generator or tachometer 24 having an input winding 26 energized from source 22 and an output winding 27 at which appears a potential, $e_g$, at constant 400 c.p.s. frequency and linearly proportional in amplitude to the speed of rotation of the generator. The winding 27 is connected to the slider 28 of a potentiometer 29, the slider 28 being movable by a shaft 31. This shaft 31 is positioned by the input quantity $\alpha$ and its displacement represents that quantity. The potentiometer terminals 32 and 33 are connected together through two fixed resistors 34 and 36, and their common terminal 37 is connected to the input terminal 38 of the amplifier 17. The output of the servomechanism consists of the angular displacement D of the motor shaft 23, and is represented by the dashed arrow 39.

The purpose of the two fixed resistors 34 and 36 is to limit the approximate cosine function to a selected range. If the function is to be variable over a maximum angular range of $$-\frac{\pi}{2} \text{ to} + \frac{\pi}{2}$$

the resistors 34 and 36 are omitted and terminals 32 and 33 are connected directly to terminal 37.

If in the potentiometer network the entire resistance be termed $R_T$ and the resistance from one end, say from terminal 37 through resistor 36 to the slider 28, be termed R, then the parallel resistance, $R_P$, of the two branches between slider 28 and terminal 37 is $$R_P = \frac{R_T R - R^2}{R_T} \qquad (3)$$

Figure 3:
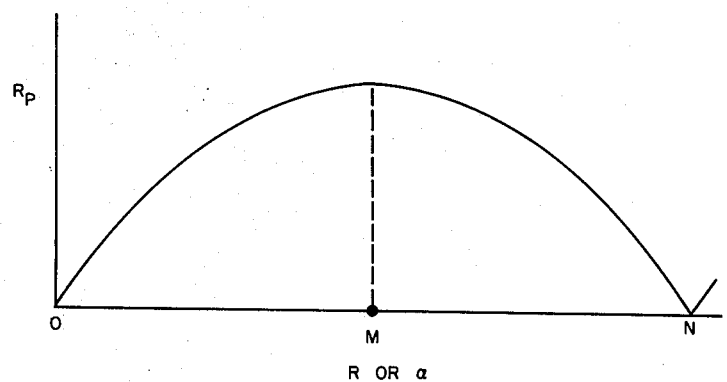
FIGURE 3 depicts a parabola illustrating the operation of the function generator.

Since the resistance R is proportional to the slider adjustment position $\gamma$, the latter may be substituted as proportional to R in the equation. This function is a quadratic and parabolic, and the parabola plotted in FIGURE 3 represents this equation. When the origin of coordinates is at the middle, M, the equation takes the form $$K_1 R_P = 1 - K_2 \alpha^2 \qquad (4)$$

in which $K_1$ and $K_2$ are constants. This, however, is similar in form to the first two terms of the series expansion of the cosine function, which is $$\cos \gamma \approx (1 - \tfrac{1}{2} \alpha^2) \qquad (5)$$

providing that $K_2 = \tfrac{1}{2}$. That is to say, the function is restricted to only a few degrees, say 6 degrees, on either side of the middle point M of the curve abscissa axis, $K_2$, should be made equal to $\tfrac{1}{2}$ and the potentiometer network of FIGURE 2 will generate a very close approximation of a cosine function. If, however, a larger range of angle $\alpha$ be required, the value of $K_2$ which will cause the network output to approximate a cosine function most closely over the required range should be employed.

The motor-generator servomechanism generates an integral, for the angular displacement D of the output shaft 39 is the integral of its speed, which is proportional to the potential $e_g$ generated by the tachometer 24.

$$D = k_1 \int e_g dt \qquad (6)$$

in which $k_1$ is the relation between the tachometer output voltage and its speed.

If the current input to amplifier 17 be neglected, all of the current $i$ through the potentiometer network passes through resistor 16, so that closely $$v = iR_s \tag{7}$$

The relation of $e_g$ to the current $i$ which it produces in the potentiometer network is, by Ohm's law, $$e_g = iR_p \tag{8}$$

But from (4) and (5), substituting for $R_p$ its approximate equivalent in terms of slider angle, assuming $K_2 = \frac{1}{2}$ $$e_g \approx k_3 i \cos \alpha \tag{9}$$

However, since the currents $i$ in Equations 7 and 9 are the same except for sign, combining, $$e_g \approx -k_3 \frac{v \cos \alpha}{R_s} \tag{10}$$

Substituting in (6)

$$D \approx K \int v \cos \alpha \, dt \tag{11}$$

That is, the angular distance D is approximately proportional to the integral of the input signal voltage magnitude $v$ multiplied by the cosine of the potentiometer positional input.

The function (11) has the form of the desired function (2) and indicates that the device provides an approximate solution of the problem depicted in FIGURE 1. When the range of the angle $\alpha$ is limited to a few degrees the approximation is good to an error of a very small fraction of 1%.

Summarizing the operation of the cosine function integrator, an electrical signal representing by its voltage magnitude the input datum quantity $v$ is introduced to resistor 16. A second datum quantity $\alpha$ is introduced as an angular deflection magnitude to the shaft 31. The motor 19 rotates at a speed such as to keep the differential input to amplifier 17 at a negligible value and rotates tachometer 24 at such speed that its output $e_g$ multiplied by the cosine of $\alpha$ just equals $v$ minus the small amplifier input. In this equilibrium condition Equation 11 is true and D is the desired instrument output.

If the parabolic and cosine functions be compared throughout one-half cycle, from $$-\frac{\pi}{2} \text{ to } +\frac{\pi}{2}$$

it is found that they are not widely different. If, therefore, the potentiometer 29, FIGURE 2, be designed with an appropriate small departure from linearity, and the resistors 34 and 36 be omitted, an exact cosine function can be generated over the complete half-cycle range, that is, from 0 to N, FIGURE 3.

Figure 4:
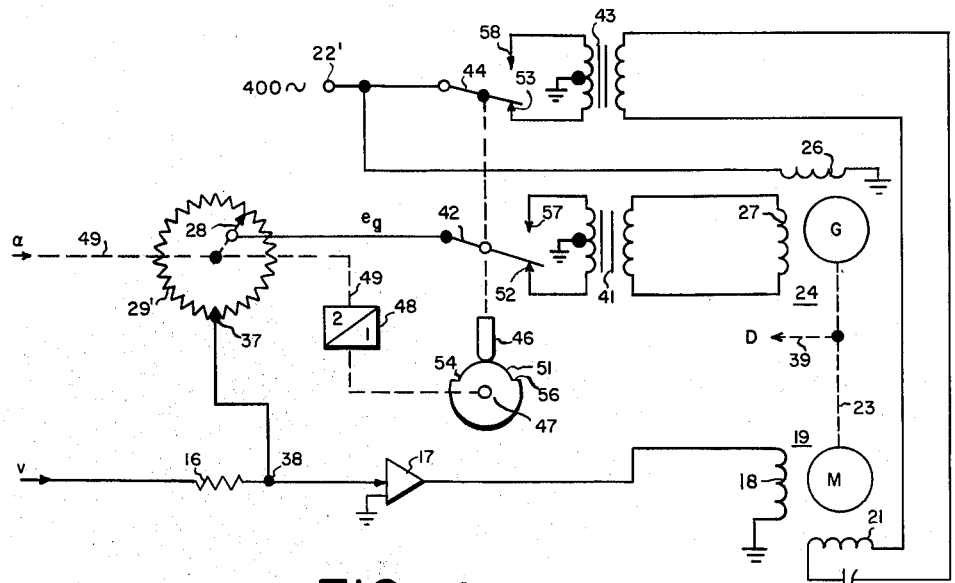
FIGURES 4 and 5 are schematic diagrams of embodiments in which the angular input is unlimited.
Figure 5:
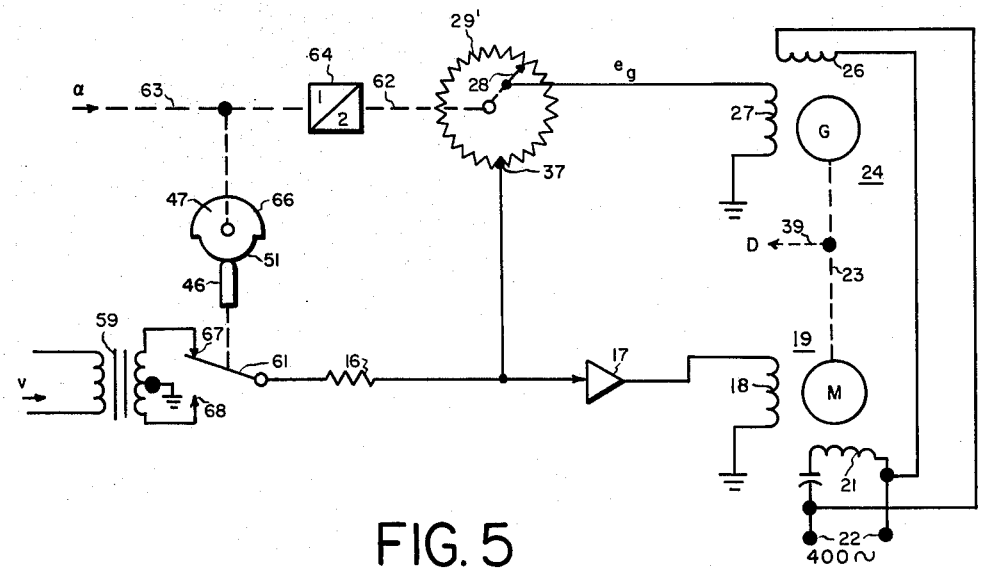

The range of the device may be extended to a full cycle of the function, or to more than one cycle, by the additions shown in FIGURES 4 and 5. This would be required if, for example, angle $\alpha$ in FIGURE 1 should exceed $+90°$ or $-90°$. The distance travelled, D, in the direction of arrow 11, FIGURE 1, would then decrease instead of increase with increasing $\alpha$, and sensing means must be added to the circuit of FIGURE 2 to make the output quantity decrease correspondingly.

In FIGURE 4 the input resistor 16, amplifier 17, and motor 19 are the same as in FIGURE 2. The potentiometer 29', however, must be circular in form and must be continuous and without stops so that the slider 28 can rotate past the terminal 37. The motor 19 drives tachometer generator 24, the exciting winding 26 of which is energized from the power terminal 22'. The tachometer output winding 27 is connected through a transformer 41 and single-pole double-throw switch 42 to slider 28. Another transformer 43 and single-pole double-throw switch 44 are interposed between the motor winding 21 and the power terminal 22'. Use of transformers 41 and 43 permits the use of single-pole switches with non-center-tapped motor and generator windings. The switches 42 and 44 are mechanically operated by the follower 46 of a cam 47. This cam is rotated through a two-to-one speed reduction gear 48 from the same shaft 49 by which the angle $\alpha$ is introduced to the potentiometer 29'.

In the operation of this circuit, the action of moving the slider arm 28 by the shaft 49 from near the terminal 37 through nearly a full revolution to the other side of the terminal 37 corresponds to a change in the independent variable $\alpha$, FIGURE 3, from near the end 0 to near the end N. In FIGURE 4 this rotation of the potentiometer through nearly a full revolution is accompanied by movement of the cam 47 through half the angle, or nearly a half revolution. During this motion the follower 46 stays on the low portion 51 of the cam and the switches 42 and 44 remain on their fixed contacts 52 and 53. Polarities are so arranged that the motor and generator rotate in a selected direction, rotating the output shaft 39 in a direction of rotation representing increase of the output quantity D. Also the feedback voltage $e_g$ is in such direction relative to input voltage $v$ that the amplifier input potential at terminal 38 is the difference and at balance is substantially that of ground. This operation is exactly that of the circuit of FIGURE 2 electrically, with resistors 34 and 36 omitted.

When the angle $\alpha$ becomes $+90°$ or $-90°$ the slider 28, FIGURE 4, is at the terminal 337. At the same time one or the other of the cam shoulders or risers 54 or 56 is under the follower 46 and, raising it, causes the switches to move to their other contacts 57 and 58.

When the angle $\alpha$ passes through $90°$, the slider 28 passes the terminal 37, corresponding to movement of the cosine function past the point N, FIGURE 3. At this point, due to operation of the switch 44, motor 19 reverses, so that the angular deflection D of output shaft 39 begins to decrease. Although the direction of rotation of the generator 24 reverse, the switch 42 also reverses the phase of the generator output so that the phase of $e_g$ remains unchanged. Thus this embodiment instruments Equation 11 for all values of the angle $\gamma$, while the embodiment of FIGURE 2 instruments angles only between $-90°$ and $+90°$.

FIGURE 5 depicts a somewhat simpler circuit for all values of $\alpha$. The input potential $v$ applied through a transformer 59 and single-pole double-throw switch 61 to the resistor 16, amplifier 17 and winding 18 of motor 19. The motor shaft 23 operates the output shaft 39 and rotates tachometer generator 24. The energizing windings 21 and 26 of the motor and generator are connected directly to the power terminals 22. The generator output winding 27 is connected directly to the slider 28 of the circular potentiometer 29' operated by the shaft 62. The input angle $\alpha$ is not applied directly to the potentiometer but is applied to a shaft 63 which is connected through a one-to-two speed increase gear 64 to the potentiometer shaft 62. The input shaft 63 is also connected directly to a cam 47 having an approximately $180°$ low level 51 and an approximately $180°$ high level 66, identical with cam 47 of FIGURE 4. The cam follower 46, FIGURE 5, is connected to operate switch 61.

In the operation of the circuit of FIGURE 5, within the range of $\alpha$ between $+90°$ and $-90°$ the cam follower remains on the low level 51 of the cam 47 and the switch 61 remains on its contact 67. During this $180°$ range of shaft 63, shaft 62 and the potentiometer slider 28 driven by it rotate $360°$, from adjacent to terminal 37 on one side, through one revolution to the other side of terminal 37. When $\alpha$ passes through $90°$, driving the slider 28 past terminal 37, the cam 47 is driven past a riser and the follower 46 operates switch 61 to its fixed contact 68. This reverses the phase of signal $v$ and therefore of the excitation of motor winding 18. This reverses the direction of motor operation and of the direction of change of the shaft deflection angle D. Additionally, the direction of rotation of the tachometer generator 24 is reversed, reversing the phase of its output signal $e_g$. But since simultaneously the phase of the input signal $v$ has been reversed, the combination of the function of $e_g$ with $v$ remains a difference, constituting the differential signal driving amplifier 17. Operation of this circuit is therefore in effect the same as that of the circuit of FIGURE 4, but with the advantage of requiring one less transformer and switch.

What is claimed is:

1. A cosine function integrator for integrating the product of a selected first signal and the cosine of a selected second signal comprising,
    an amplifier having a potential corresponding to said first signal applied to the input thereof through a series resistor,
    a motor energized by the output of said amplifier,
    a generator operated by said motor generating a potential proportional to the speed thereof,
    a potentiometer having its ends connected together and to the junction of said series resistor and the input of said amplifier,
    means adjusting the slider of said potentiometer in accordance with said second signal,
    and means impressing the output of said generator on the slider of said potentiometer.

2. A cosine function integrator for integrating the product of a selected first signal and the cosine of a selected second signal comprising,
    an amplifier having a potential corresponding to said first signal applied to the input thereof through a series resistor,
    a motor energized by the output of said amplifier,
    a generator operated by said motor generating a potential proportional to the speed thereof,
    a one-turn potentiometer having its ends connected together and to the junction of said series resistor and the input of said amplifier,
    means adjusting the slider of said potentiometer in accordance with said second signal,
    means impressing the output of said generator on the slider of said potentiometer,
    and switch means for reversing the direction of rotation of said motor on successive revolutions of said potentiometer slider.

3. A cosine function integrator for integrating the product of a selected first signal and the cosine of a selected second signal comprising,
    an amplifier having a potential corresponding to said first signal applied to the input thereof through a series resistor,
    a motor energized by the output of said amplifier,
    a generator operated by said motor generating a potential proportional to the speed thereof,
    a one-turn potentiometer having its ends connected together and to the junction of said series resistor and the input of said amplifier,
    means adjusting the slider of said potentiometer in accordance with said second signal,
    means impressing the output of said generator on the slider of said potentiometer,
    an alternating current source energizing said motor and generator,
    and means for simultaneously reversing the phase of the energy applied to said motor and the potential applied to the slider of said potentiometer on successive revolutions of said slider.

4. A cosine function integrator for integrating the product of a selected first signal and the cosine of a selected second signal comprising,
    an amplifier having an alternating potential corresponding to said first signal applied to the input thereof through a series resistor,
    a motor energized by the output of said amplifier,
    a generator operated by said motor generating a potential proportional to the speed thereof,
    a one-turn potentiometer having its ends connected together and to the junction of said series resistor and the input of said amplifier,
    means adjusting the slider of said potentiometer in accordance with said second signal,
    means impressing the output of said generator on the slider of said potentiometer,
    and means for reversing the phase of the alternating potential applied to the input of said amplifier on successive revolutions of the slider of said potentiometer.

References Cited by the Examiner

UNITED STATES PATENTS

| | | | |
|---|---|---|---|
| 2,622,231 | 12/1952 | Gray | 235—183 X |
| 2,858,623 | 11/1958 | Stern et al. | 35—12 |
| 2,915,247 | 12/1959 | Tolson | 235—183 |
| 2,965,876 | 12/1960 | Meunier et al. | 235—183 X |
| 2,994,479 | 8/1961 | Chapman | 235—183 |
| 3,017,556 | 1/1962 | Smoot. | |
| 3,018,052 | 1/1962 | Fogarty | 235—197 |
| 3,022,009 | 2/1962 | Fogarty | 235—197 X |

FOREIGN PATENTS

| | | |
|---|---|---|
| 2,977,804 | 4/1961 | France. |

MALCOLM A. MORRISON, *Primary Examiner.*